(12) United States Patent
Hollander et al.

(10) Patent No.: US 9,832,971 B1
(45) Date of Patent: Dec. 5, 2017

(54) PET FEEDING SYSTEM (71) Applicant: SMART FEEDING SOLUTIONS, INC., Brooklyn, NY (US)

(72) Inventors: Karen Hollander, Brooklyn, NY (US); David S. Hollander, Brooklyn, NY (US); Mark Maclean-Blevins, Westminster, MD (US)

(73) Assignee: Smart Feeding Solutions Inc., Brooklyn, NY (US)

( * ) Notice: Subject to any disclaimer, the term of this patent is extended or adjusted under 35 U.S.C. 154(b) by 104 days.

(21) Appl. No.: 14/955,336

(22) Filed: Dec. 1, 2015

Related U.S. Application Data (60) Provisional application No. 62/123,991, filed on Dec. 4, 2014.

(51) Int. Cl.
*A01K 5/01* (2006.01)

(52) U.S. Cl.
CPC .......... *A01K 5/0135* (2013.01); *A01K 5/0128* (2013.01)

(58) Field of Classification Search
CPC .. A01K 5/0114; A01K 5/0128; A01K 5/0135; A01K 7/00; A01K 7/005; A01K 7/06; E05D 7/1077; B65D 43/163; B65D 2251/1058; B65F 1/1646
USPC .......... 119/51.5, 61.5, 61.54, 61.55, 72, 74; D30/121, 129, 130, 133; 220/23.83, 220/23.87, 495.03, 495.06, 495.07, 220/495.08, 495.1, 503, 524, 553, 554, 220/603, 719, 833, 834, 835, 845; 222/205; 215/6, 10
See application file for complete search history.

(56) References Cited

U.S. PATENT DOCUMENTS

| | | | | |
|---|---|---|---|---|
| 3,076,435 A | * | 2/1963 | Seymour | A01K 7/005 119/61.54 |
| 3,498,268 A | * | 3/1970 | Langevin | A01K 5/0114 119/61.54 |
| 5,209,184 A | * | 5/1993 | Sharkan | A01K 5/0114 119/61.56 |
| 6,142,101 A | * | 11/2000 | Pelsor | A01K 7/005 119/61.54 |
| 6,276,299 B1 | * | 8/2001 | Firstbrook | A01K 7/06 119/74 |
| 6,301,747 B1 | * | 10/2001 | Parein | A63H 33/062 16/260 |
| 2006/0027176 A1 | * | 2/2006 | McQuade | A01K 5/0128 119/61.5 |
| 2006/0201055 A1 | * | 9/2006 | Rowe | A01K 5/0114 43/131 |

(Continued)

*Primary Examiner* — Monica L Williams
*Assistant Examiner* — Brady W Frazier
(74) *Attorney, Agent, or Firm* — Rosenberg, Klein & Lee (57) ABSTRACT

A pet feeding system includes amongst its features a bowl member, at least one plate member, and an annularly contoured lid member. In the bowl member, a lower base plate and an upper base plate are integrally formed with a sidewall to define a liquid containing chamber between the lower and upper base plates. Moreover, the sidewall extends vertically above the upper base plate. The plate member is mounted on the upper base plate. In certain exemplary uses, the upper base plate has a recessed surface to receive the plate member. The plate member is adapted to receive an ingestible good product. Furthermore, the annularly contoured lid member is rotationally and fixedly attached to the sidewall of the bowl member.

19 Claims, 8 Drawing Sheets

(56) References Cited

U.S. PATENT DOCUMENTS

| | | | |
|---|---|---|---|
| 2006/0201434 A1* | 9/2006 | Kujawa | A01K 5/0128 119/61.5 |
| 2008/0216754 A1* | 9/2008 | Lorenzana | A01K 5/0114 119/61.55 |
| 2008/0302307 A1* | 12/2008 | Bertsch | A01K 5/0114 119/61.5 |
| 2013/0291802 A1* | 11/2013 | Carpentieri | A01K 7/00 119/72 |

* cited by examiner

PET FEEDING SYSTEM

FIELD OF THE INVENTION

This invention directs itself to the field of feeding systems for pets serving as a feeding station for general use by domesticated pets. This system relates in particular to the field of portable pet bowl or feeding systems which can easily be transported from one location to another. Still further, this system is directed to the field of portable pet feeding systems which permit stabilization of the pet feeding system during a feeding process, however, the pet feeding system may be destabilized and transported to remote locations. More in particular, this system directs itself to pet feeding systems which utilize disposable plate members releasably captured within the pet feeding system during use. More in particular, this invention directs itself to pet feeding systems where disposable plate members may be easily removed from the pet feeding system and disposed of subsequent to a feeding session. More in particular, the subject pet feeding system is directed to the field of releasably capturing disposable plate members within a pet bowl during a feeding session and permitting easy removal of plate members from the pet feeding system subsequent to the feeding session.

BACKGROUND OF THE INVENTION

There are many feeding systems using bowls for the containment of ingestible food for pets known in the art. Veterinarians and other pet caretakers recommend that food and water bowls be cleaned on a daily basis as part of maintaining the pet's overall health and well-being. Feeding plates or bowls which are not properly cleansed subsequent to feeding sessions are prone to attract harmful bacteria, insects, molds, and other contaminants which impact directly upon the pet's health.

In general, pet owners are subjected to the burdensome and inconvenient tasks of having to wash and sanitize pet food bowls at least on a daily basis which is particularly true if there are multiple pets in the home receiving multiple feedings.

Pet feeding systems are generally formed in the contour of a bowl which must be cleansed and sanitized periodically. As stated, cleansing and sanitization is time consuming on the part of the pet owner and if not properly cleansed or sanitized, may have deleterious effects on the health of the pet.

Additionally pet feeding systems which dispense a predetermined amount of ingestible pet food at predetermined times have been used in numerous known prior art systems. Such pet feeding systems generally use a standard feed bowl where the food is dispensed into the container or pet bowl and suffer from the same disadvantages as a standard pet bowl.

Further, many automated pet feeding systems are not easily transportable from one location to another and do not have a stabilization mechanism where a pet bowl may be stabilized during the feeding session, due to the fact that the pet would be able to displace the bowl during the feeding session.

PRIOR ART

Standard pet bowls formed of plastic, metal, or some like composition are well-known in the art. Generally, such pet feeding systems which include a standard bowl have the disadvantage of not being able to provide a hygienic and sanitized feeding surface upon which the pet would come in contact during a feeding session. Such bowls accumulate microbes and other contaminants which would have a deleterious effect on the pet.

Additionally, such pet feeding system bowls are easily movable along a planar surface which may cause the food to be ejected from the bowl and necessitate further cleansing of the planar surface upon which the bowl rests. Such bowls generally do not have a stabilization system which maintains the bowl in a relatively fixed location during a pet feeding session.

Further, such prior art bowls do not provide for a disposable plate member adapted to be releasably captured by the pet feeding system to permit the pet to consume the food within the bowl and then allow the pet owner to dispose of the plate member for a next feeding session.

Still further, such prior art bowl systems do not have any releasable capturing mechanism for capturing disposable plate members within the pet feeding system to maintain the disposable plate members in a relatively fixed position during a feeding session.

In other pet feeding systems, there is provided an automatic feeding station where pet food is automatically dispensed into a bowl at predetermined intervals. Once again, such pet feeding systems generally utilize a pet bowl which is not adaptable to easy transport from one location to another and suffer the same hygienic disadvantages as is provided by a stand-alone feeding bowl.

SUMMARY OF THE INVENTION

A pet feeding system includes amongst its features a bowl member, at least one plate member, and an annularly contoured lid member. The bowl member includes a sidewall, and an upper base plate and a lower base plate. The lower base plate and the upper base plate are integrally formed with the sidewall to define a liquid containing chamber between the lower and upper base plates. Further, the sidewall extends vertically above the upper base plate. Moreover, the annularly contoured lid member may be rotationally and fixedly attached to the sidewall of the bowl member. The plate member, which is adapted to receive an ingestible food product, is mounted on the upper base plate.

In some exemplary uses, the annularly contoured lid member includes a catch mechanism. This catch mechanism releasably engages a sidewall protrusion member which is formed on the sidewall. The catch mechanism's releasable engagement with the sidewall protrusion member is responsive to the lid member being rotationally activated to a closed position.

The catch mechanism may include a resilient catch member. The resilient catch member is fixedly secured to the lid member, and such catch member is releasably insertable over the sidewall protrusion member to releasably secure the catch member to the sidewall. In other exemplary uses, the sidewall protrusion member has a substantially arcuate bar member which is adapted to releasably capture the resilient catch member.

The catch member may include a catch member first section and a catch member snap section. The catch member first section is integrally formed with the lid member, and the catch member snap section is formed in a one piece formation with the catch member first section. This catch member snap section is adapted to be releasably attached to the sidewall protrusion member.

The sidewall protrusion member may include a substantially arcuate bar member positioned within a sidewall recess. The catch member is then contoured for sliding engagement within the sidewall recess, the catch member snap section being releasably captured by the arcuate bar member.

The annularly contoured lid member may include a hinge mechanism. This hinge mechanism includes a pair of hinge arms that are formed in an inverted U-shape formation. Each such hinge arm is secured to the annularly contoured lid member. Further, a pair of hinge arm flange members is respectively secured to each of the hinge arms, with such pair of hinge arm flange members extending in a direction substantially normal to that of the pair of the hinge arms.

Each hinge arm flange member may include a hinge arm lug member. In other exemplary uses, each hinge arm lug member is contoured to have a spherical envelope.

The pair of hinge arms may be slidingly received within a hinge arm recess that is formed in the sidewall. In yet other exemplary uses, a pair of spaced apart hinge recesses is formed in the sidewall for rotationally receiving the hinge arm lug members.

A drain member may be formed through the sidewall. This drain member is in fluid communication with the liquid containing chamber and defines a liquid inlet/outlet port.

A cap member may be threadedly engageable with the drain member. In yet other exemplary uses, a plug member may be used for reversible insertion within the inlet/outlet port.

A hinge mechanism may be contoured as a yoke, and includes a pair of hinge arms which extend around the drain member and are adapted to be rotationally displaceable with respect to the sidewall.

In general, the pet feeding system includes a bowl member which has a lower liquid containing chamber and an upper open chamber which accommodates standard sized and commercially available disposable plates. The lower liquid containing chamber is filled with a liquid through an inlet/outlet port which may be sealed by a threaded securement or plug insert. Wet/dry food may be placed onto the disposable plate captured in the upper open chamber.

Releasable capturing of the disposable plates may be afforded through a number of mechanisms including a lid or pressure collar having a number of L-shaped clasps or flanges extending from a bottom section. The clasps are then inserted into correspondingly aligned slots formed into the top of the bowl member. The inner edges of the collar or lid are contoured to contact with and secure to the outer lip of the disposable plate or bowl member. A twisting of the lid or collar then will lock the clasps or flanges into the position at the end of each slot permitting an edge of the collar or lid portion to press and hold the top of the lip of the plate to the bowl.

The bowl member may also include a number of pressure flanges formed integrally to the bowl member at the top of the bowl member and the disposable plate members may be pushed past the flanges in order to seat properly in the cavity formed by the upper open chamber. The disposable plates being formed of plastic, paper, or other bendable compositions may be forced past the pressure flanges to permit securement of the disposable plates within the bowl member.

An object of the subject invention is to provide a hygienic and convenient pet feeding system.

A further object of the subject invention is to provide a pet feeding system which uses disposable plate members during a feeding session of a pet.

Still further, it is an object of the subject pet feeding system to provide a pet feeding system where the pet feeding system can be stabilized on a surface during a feeding session.

It is a still further object of the subject system to provide a pet feeding system where the pet feeding system may be easily transportable between one location and another.

Further, it is an object of the subject pet feeding system to provide a transportable and transferrable system where disposable plate members may be releasably captured within the pet feeding system and then easily removed and disposed of subsequent to the pet feeding session.

DESCRIPTION OF THE PREFERRED EMBODIMENTS

Figure 1:
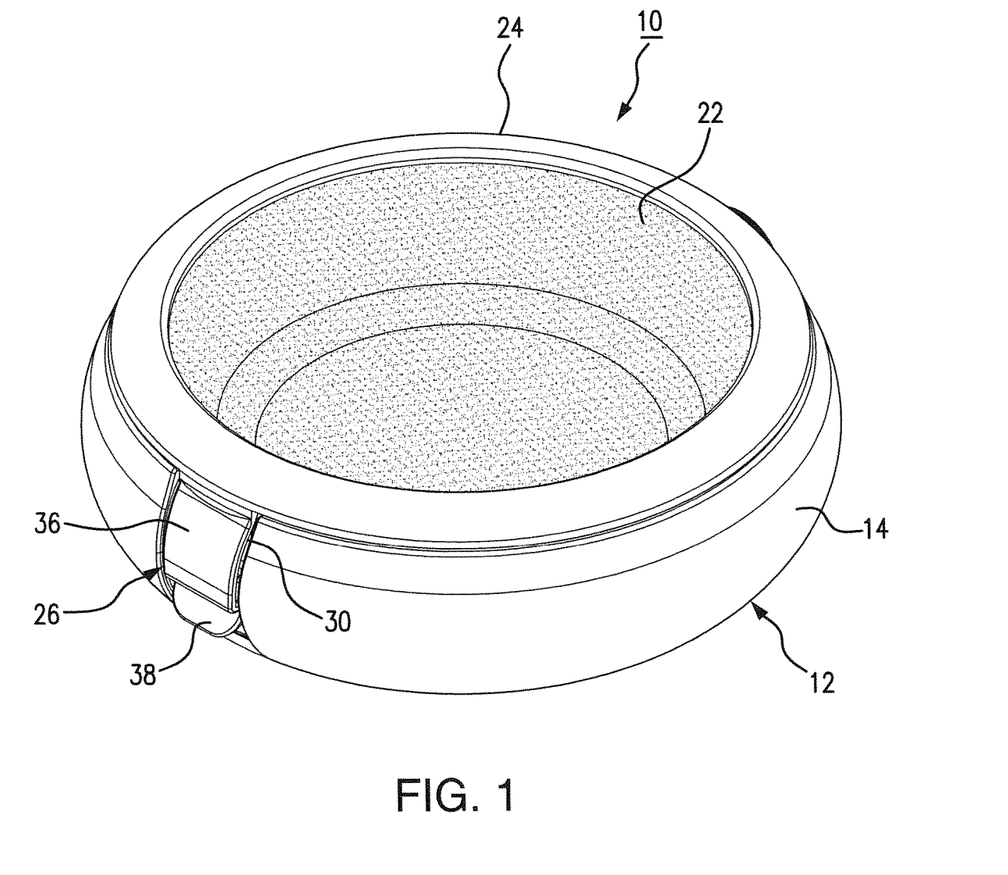
FIG. 1 is a frontal perspective view showing a pet feeding system with a catch mechanism of an annularly contoured lid member releasably engaging a sidewall protrusion member formed on a sidewall of a bowl member.

FIG. 1 shows a perspective view of Applicant's pet feeding system 10. The pet feeding system 10 includes a bowl member 12, at least one plate member 22, and an annularly contoured lid member 24. In certain exemplary uses, the plate member 22 is a disposable plate member selected from the group consisting of paper plate members and plastic plate members. The bowl member 12 includes a sidewall 14. The annularly contoured lid member 24 is rotationally and fixedly attached to the sidewall 14 of the bowl member 12.

Figure 5:
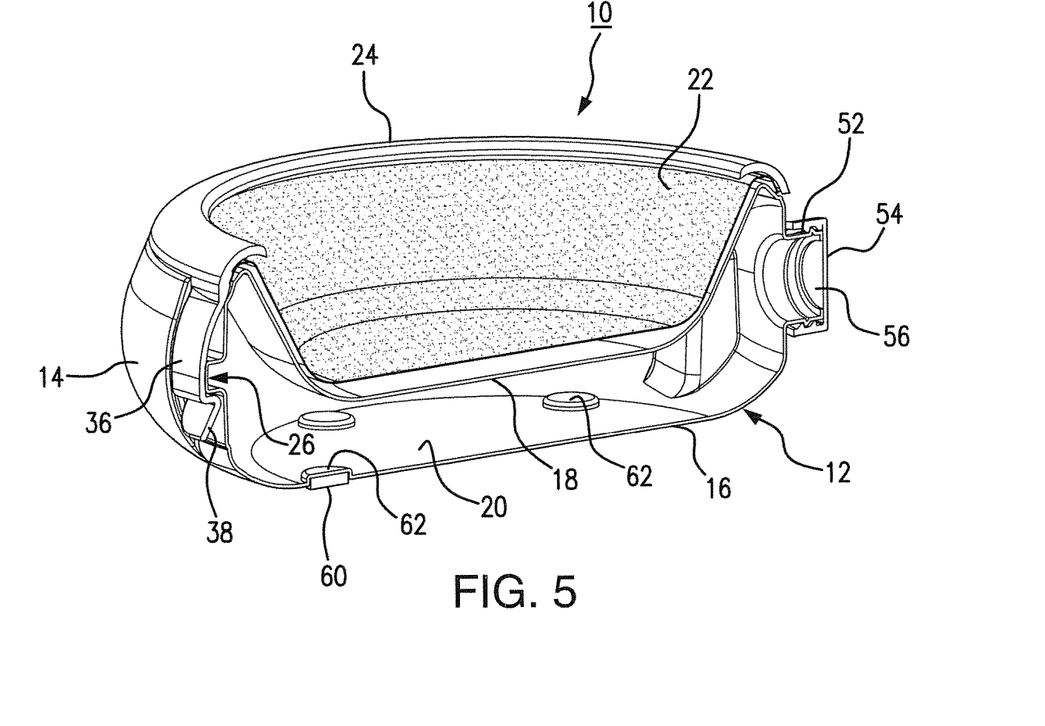
FIG. 5 is a view showing a liquid containing chamber which is defined between a lower base plate and an upper base plate that are integrally formed with the bowl member's sidewall.

As shown in FIG. 5, the bowl member 12 further includes a lower base plate 16 and an upper base plate 18 that are integrally formed with the sidewall 14. A closed liquid containing chamber 20 is defined between the lower base plate 16 and the upper base plate 18. Further, the sidewall 14 extends vertically above the upper base plate 18. The upper base plate 18 has a recessed surface to receive the plate member 22.

Figure 3:
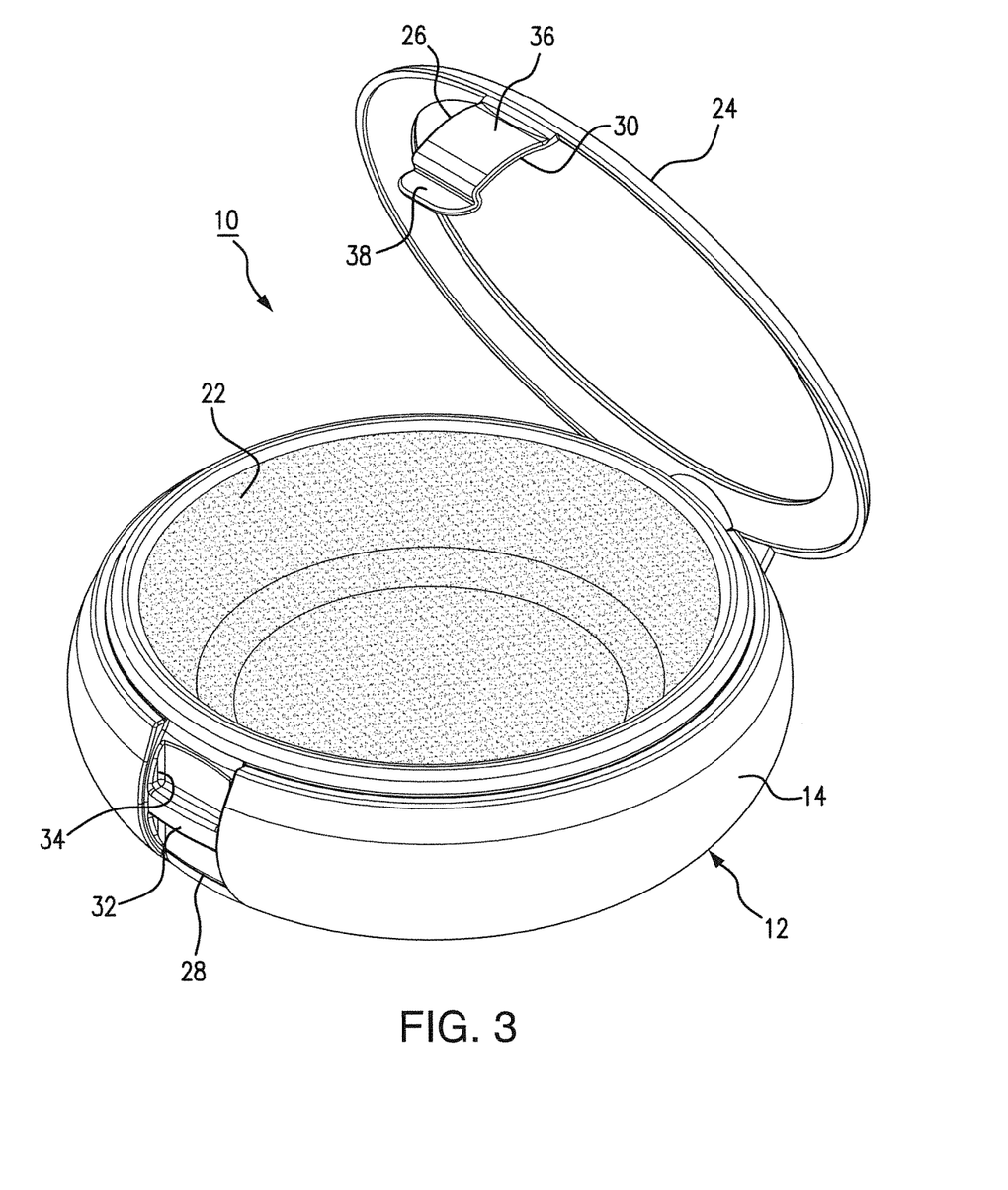
FIG. 3 is a view showing the catch mechanism's catch member first section and catch member snap section which is formed in a one piece formation with the catch member first section.

Returning to FIG. 1, the annularly contoured lid member 24 being attached to the sidewall 14 of the bowl member 12 is shown. A catch mechanism 26 of the annularly contoured lid member 24 is shown to be releasably engaging the sidewall 14 of the bowl member 12. More specifically, a sidewall protrusion member 28, which is more clearly shown in FIG. 3, is in releasable engagement with the catch mechanism 26. Responsive to the annularly contoured lid member 24 being rotationally activated to a closed position, the catch mechanism 26 releasably engages the sidewall protrusion member 28.

Upon the catch mechanism 26's engagement with the sidewall protrusion member 28, the plate member 22 is resultingly also locked in place. Ingestible food is placed on the plate member 22 without the disadvantage result of such plate member 22 being displaced. In order to ensure stabilization of the pet feeding system 10 during a feeding session, liquid, preferably water, is inserted into chamber 20 to provide additional weight to the pet feeding system 10. Liquid which is received in the liquid containing chamber 20 provides a stabilizing force for the combination bowl member 12, plate member 22, and lid member 24 structure. Even if the recipient of such food, such as a pet, exerts forces on the bowl member 12 from various angles, the liquid in the liquid containing chamber 20 will ensure that the bowl member 12 remain stabilized, and food is not spilled over from the plate member 22 to the external environment.

Turning to FIG. 3, there is shown a more detailed view of the annularly contoured lid member 24. FIG. 3 shows lid member 24 being rotationally attached to the sidewall 14 of the bowl member 12, and in position to be releasably attached to such sidewall. As seen, catch mechanism 26 is about to be releasably engaged with the sidewall protrusion member 28 of the sidewall 14 of the bowl member 12.

Catch mechanism 26 has a resilient catch member 30. This resilient catch member 30 is fixedly secured to the annularly contoured lid member 24. The resilient catch member 30 is thus releasably insertable over the sidewall protrusion member 28 to releasably secure the catch member 30 to the sidewall 14. FIG. 3 depicts the catch member 30 in an open state in preparation for a plate member 22 to be inserted onto the upper base plate 18. FIG. 1 depicts the lid member 24 in a closed state wherein the lid member 24 is engaged with the sidewall 14 and bowl member 12.

In FIG. 3, the resilient catch member 30 is shown to be formed in a one piece formation with the annularly contoured lid member 24. When a user desires to remove the plate member 22 or insert a new plate member 22, FIG. 3 shows the resilient catch member 30 prior to being inserted over the sidewall protrusion member 28. Resilient catch member 30 can be releasably inserted over sidewall protrusion member 28 to releasably secure the catch member 30 to the sidewall 14 of the bowl 12 thereby securing lid member 24 to bowl member 12.

As further shown in FIG. 3, the resilient catch member 30 includes a catch member first section 36 and a catch member snap section 38. The catch member first section 36 is formed with the annularly contoured lid member 24. The catch member snap section 38 is formed in a one piece formation with the catch member first section 36, and is adapted to be releasably attached to the sidewall protrusion member 28. Catch member first section 36 and a catch member snap section 38 ensure that a firm but releasable connection is formed between the lid member 24 and the sidewall 14 of the bowl member 12.

In FIG. 3, the sidewall protrusion member 28 is shown to be positioned within a recess 34 of the sidewall 14 of the bowl member 12. Further, a substantially arcuate bar member 32 is positioned within such sidewall recess 34. The resilient catch member 30 is configured and contoured for sliding engagement within the sidewall recess 34. The catch member snap section 38 extends over and is releasably captured by the arcuate bar member 32. As shown in FIG. 1, the capturing of the catch member snap section 38 by the arcuate bar member 32 provides for a stable and strong securement of the resilient catch member 30 and lid member 24 to the sidewall 14 of the bowl member 12. Since resilient catch member 30 is formed in a one piece formation with the lid member 24, lid member 24 is also stably and firmly secured to the sidewall 14 of the bowl member 12.

Catch member 30 may be molded in one piece formation with lid member 24 or fixedly attached to such lid member by other means such as by bolting, screws, or some like mechanism not important to the inventive concept as herein described. The important consideration is that catch member 30 be cantilevered to lid member 24 to allow displacement of catch member 30 when placed into engagement with sidewall protrusion member 28.

Figure 2:
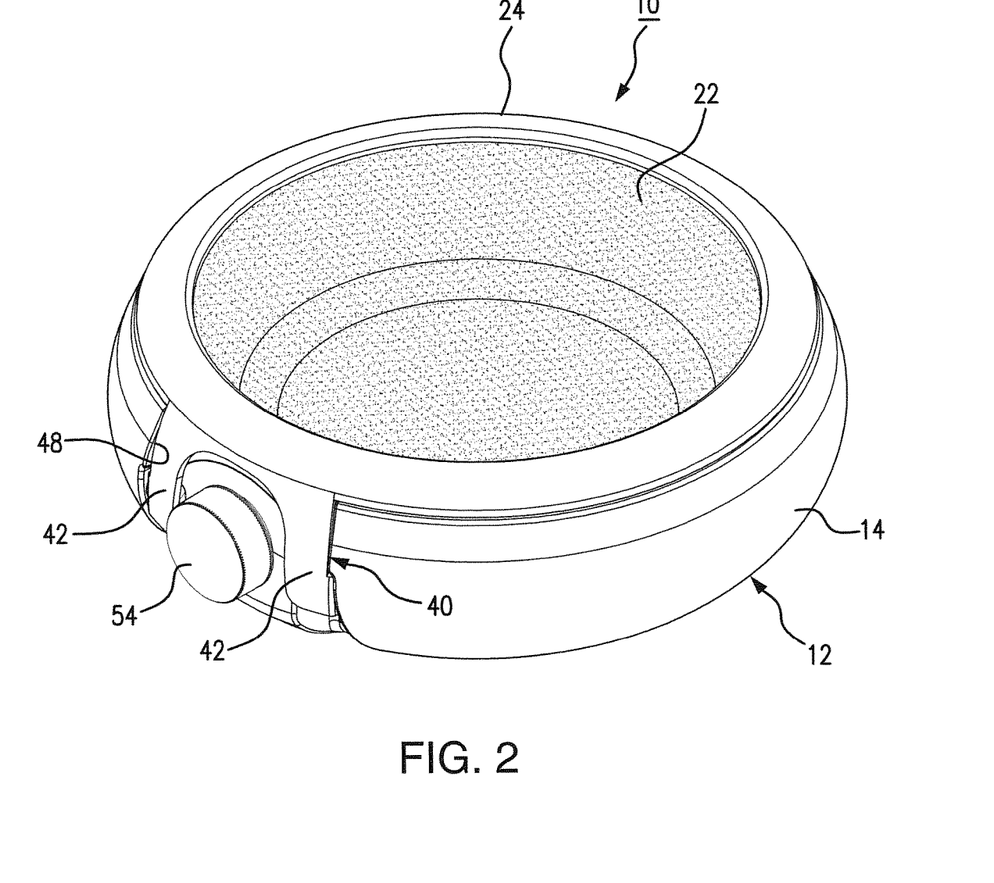
FIG. 2 is a rear perspective view showing a pet feeding system with a hinge mechanism of the annularly contoured lid member rotationally attached to a hinge arm recess formed on the sidewall of the bowl member.

Turning to FIG. 2, such depicts the lid member 24 being attached to the sidewall 14 of the bowl member 12. This attachment is accomplished by use of hinge mechanism 40. Hinge mechanism 40 allows the lid member 24 to be rotated with respect to the sidewall 14 of the bowl member 12. When a user desires to remove the plate member 22, the user first releases the catch mechanism 26 from engagement with the sidewall protrusion member 28, and then rotates the lid member 24 out of engagement with the sidewall 14.

In certain exemplary uses, the hinge mechanism 40 is contoured as a yoke contour. This yoke-contoured hinge mechanism 40 has a pair of hinge arms 42 extending around a drain member 52. Moreover, this pair of hinge arms 42 is rotationally displaceable with respect to the sidewall 14 of the bowl member 12. The yoke shape allows the oppositely-spaced hinge arms 42 of the pair of hinge arms to stably rotate and connect the lid member 24 to the sidewall 14. Further, such a yoke shape with two hinge arms 42 permits a more even distribution of forces during rotation of the lid member 24 with respect to the sidewall 14.

As shown in FIG. 2, the pair of hinge arms 42 is formed in an inverted U-shape formation. Each hinge arm 42 is secured to the annularly contoured lid member 24 in one piece molding or some other attachment such as bolting, riveting, or other securement mechanism not important to the inventive concept as herein described. The rotational movement of each hinge arm 42 can thus be controlled by movement of the lid member 24. The user may hold the lid member 24 anywhere along its surface, and then rotate the lid member 24 into position by rotational displacement of the lid member 24. In FIG. 2, the hinge mechanism 40 with the hinge arms 42 has been rotatably attached to the sidewall 14 of the bowl member 12. The user fixedly attaches the lid member 24 to the sidewall 14 by securing the catch mechanism 26 to the sidewall protrusion member 28.

Figure 4:
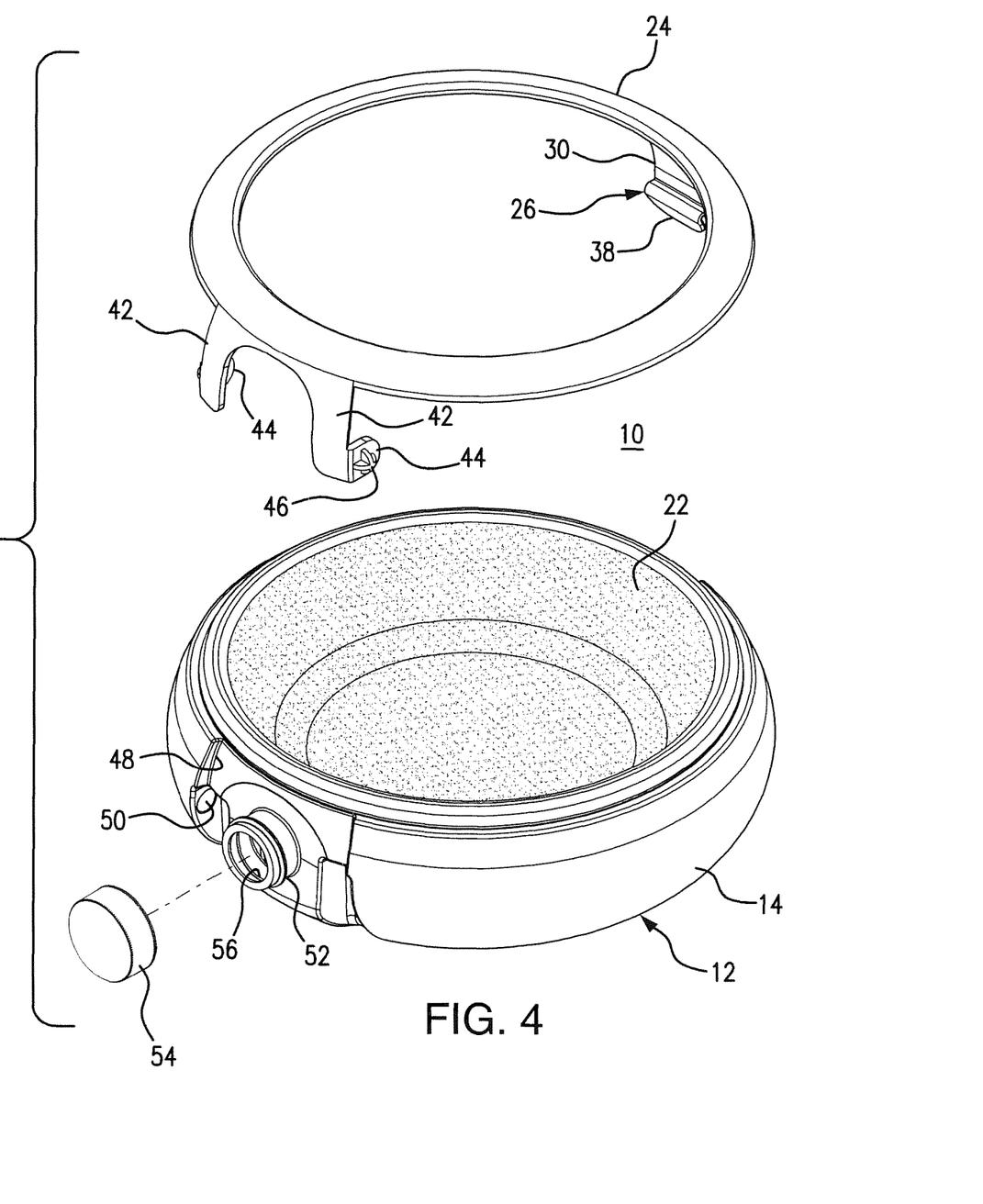
FIG. 4 is a blow-out perspective view showing the hinge mechanism's inverted U-shaped pair of hinge arms and a pair of hinge arm flange members which are respectively secured to each of the hinge arms and which extend in a direction substantially normal to that of the hinge arms themselves.

As clearly shown in FIG. 4, each hinge arm 42 has secured to it a hinge arm flange member 44. The pair of hinge arm flange members 44 extend in a direction substantially normal to that of the respective hinge arms 42. The pair of hinge arms 42 extend in a vertical direction with respect to the plane of lid member 24, whereas the pair of hinge arm flange members 44 extend in a horizontal direction towards the sidewall 14. The catch mechanism 26 and the hinge mechanism 40 are on opposing ends/edges of the annularly contoured lid member 24.

Figure 7:
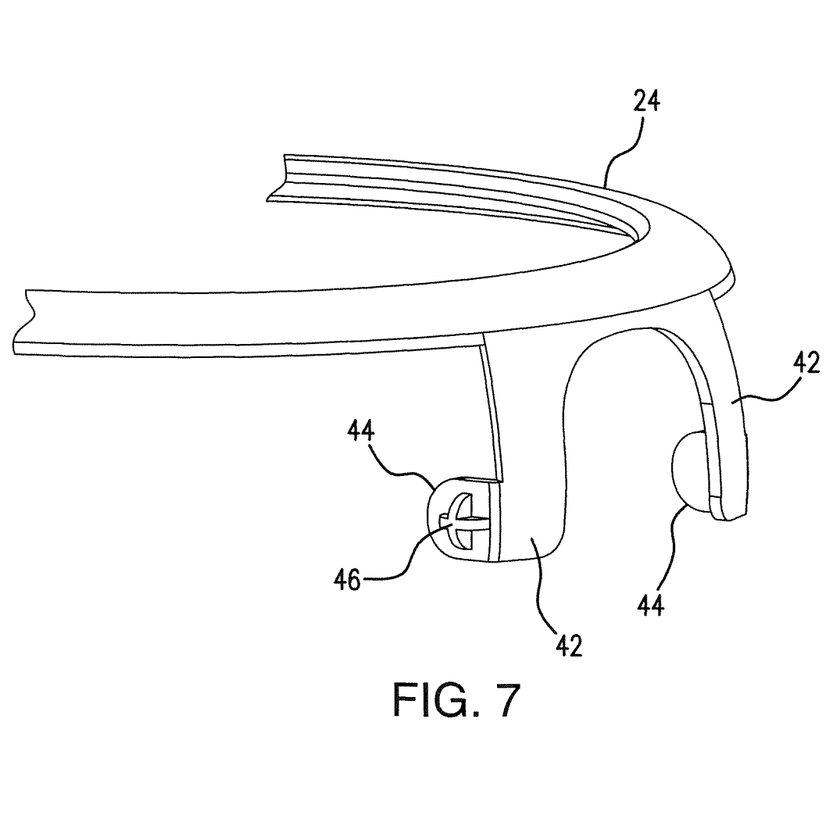
FIG. 7 is a partial perspective view showing the hinge arm flange members with contoured hinge arm lug members have a spherical envelope; and, FIG. 8 is a perspective view of an embodiment of the pet feeding system showing a releasable capturing mechanism for a lid on a pet feeding bowl.

Each of the hinge arm flange members 44 includes a hinge arm lug member 46 as shown in FIG. 7. In FIG. 4, a hinge arm lug member 46 of the right side hinge arm flange member 44 is shown, and in FIG. 7, a hinge arm lug member 46 of the left side hinge arm flange member 44 is shown. These hinge arm lug members 46 provide further stability when rotating the pair of hinge arms 42 with respect to the sidewall 14 of the bowl member 12. Moreover, each of the hinge arm lug members 46 is contoured to have a spherical envelope. This spherical envelope aids in rotatably attaching the pair of hinge arms 42 to the sidewall 14.

The pair of hinge arms 42 is slidingly received within a hinge arm recess 48 shown in FIG. 4, which is formed in the sidewall 14 of the bowl member 12. A pair of spaced apart hinge recesses 50 is formed in the sidewall 14 of the bowl member 12. The pair of spaced hinge recesses 50 rotationally receive the pair of hinge arm lug members 46. As shown in FIG. 4, the pair of hinge arm lug members 46 are rotated with respect to the pair of spaced apart hinge recesses 50. The rotational attachment of the lid member 24 is further strengthened as a result of the pair of hinge arm lug members 46 being received in the hinge recesses 50. The user therefore does not have to apply as much pressure on the lid member 24 during rotational displacement of lid member 24.

The rotational attachment of the hinge mechanism 40 to the sidewall 14 of the bowl member 12 is an important initial step in stably mounting the lid member 24 to the bowl member 12. The user can fixedly attach the catch mechanism 26 to the sidewall protrusion member 28 when the rotational attachment of the pair of hinge arms 42 with respect to the sidewall 14 is a stable attachment. The spaced apart hinge recesses 50 rotationally receiving the hinge arm lug members 46 provide a stable rotational attachment for the lid member 24.

As seen in FIGS. 2 and 4, the yoke contouring of hinge arms 42 permits insertion of hinge arms 42 around drain member 52 to allow pet feeding system 10 to present a minimum profile with an integrated opening/closing mechanism.

As shown in FIG. 5, the liquid containing chamber 20 is defined between the lower base plate 16 and the upper base plate 18 of the bowl member 12. The upper base plate 18 and the lower base plate 16 are integrally formed with the sidewall 14. Furthermore, the sidewall 14 extends vertically above the upper base plate 18 to provide a compartment within which plate members 22 may be mounted. The liquid provided in the liquid containing chamber 20 stabilizes the bowl member 12 during use in a feeding session. As liquid is filled into the liquid containing chamber, the mass/weight of the bowl member 12 is increased. This increased mass/weight of the bowl member 12 increases the stability of the bowl member 12. The added weight even makes it much more difficult to tilt the bowl in various directions. Such tilting may happen when a pet attempts to grab food from the plate member 22. It is thus necessary to ensure that a mechanism is provided to prevent excessive tilting or displacement of the bowl member 12.

It is rudimentary that the more weight the bowl member 12 has, the harder it will be to push the bowl member 12 out of place. This ensures that the food placed in the plate member 22 is not spilled to an outside of the bowl member 12. However, at the same time, if the weight of the bowl member 12 is increased, it will become difficult for the user to move the bowl member 12 from one location to another. Thus a mechanism which allows the bowl member 12 to be transported or moved to different locations with ease is important to the transportability of the pet feeding system 10.

A drain member 52 is formed through the sidewall 14 of the bowl member 12. Drain member 52 is in fluid communication with the liquid containing chamber 20 and defines a liquid inlet/outlet port 56. Liquid can thus be emptied and drained from the liquid containing chamber 20 via such drain member 52. For example, when the user wants to move the bowl member 12 from one location to another, liquid from the liquid containing chamber 20 can be emptied through inlet/outlet port 56 of drain member 52.

The volume of liquid placed in the liquid containing chamber 20 can be tailored to a user's particular needs. It is not necessary that either the entire liquid containing chamber 20 has to be filled with a particular liquid or that the entire liquid containing chamber 20 has to be emptied of such liquid. In certain circumstances, the user may want the bowl member 12 to be moved from its current location. In such instances, the user can partially fill the liquid containing chamber 20 with a liquid. Therefore the amount and volume of liquid placed in the liquid containing chamber 20 can be tailored to fit a particular user's needs. When pet feeding system 10 is to be stabilized on an external surface, liquid, preferably water, is inserted through inlet/outlet port 56 of drain member 52.

The compositions of liquid used in the liquid containing chamber 20 can affect the stability of the bowl member 12. For example, in most cases, a user is likely to use water as the liquid for the liquid containing chamber 20. This is due to the fact that water is easily available and easier to dispose of than other liquids. However in certain instances a user may desire to use a higher viscosity liquid to fill the liquid containing chamber 20 with. In such a case, a liquid such as an oil based composition may be used. This will provide greater stability to the bowl member 12 over that of water due to the fact that the liquid in the liquid containing chamber 20 has a very high viscosity.

As shown in FIG. 5, the upper base plate 18 provides a complete barrier between the liquid containing chamber 20 and the plate member 22. Therefore the plate member 22 and any food item placed in such plate is completely isolated from the liquid in the liquid containing chamber 20. It is important to provide such isolation to ensure that the food in the food plate is not in any way altered from its original form. Further the plate member 22 will not be damaged by the liquid in the liquid containing chamber 20. This will allow for a seamless transfer between various plate members 22 without having to worry about having to reuse any particular plate member 22 after its utility has been finished. In certain exemplary uses, when plastic plate members are used, a new plastic paper plate member can be received at the upper base plate 18 each time a meal has been finished and a new meal needs to be provided. The disposability of plate members 22 is important to the concept of providing a hygienic pet feeding system 10.

Figure 6:
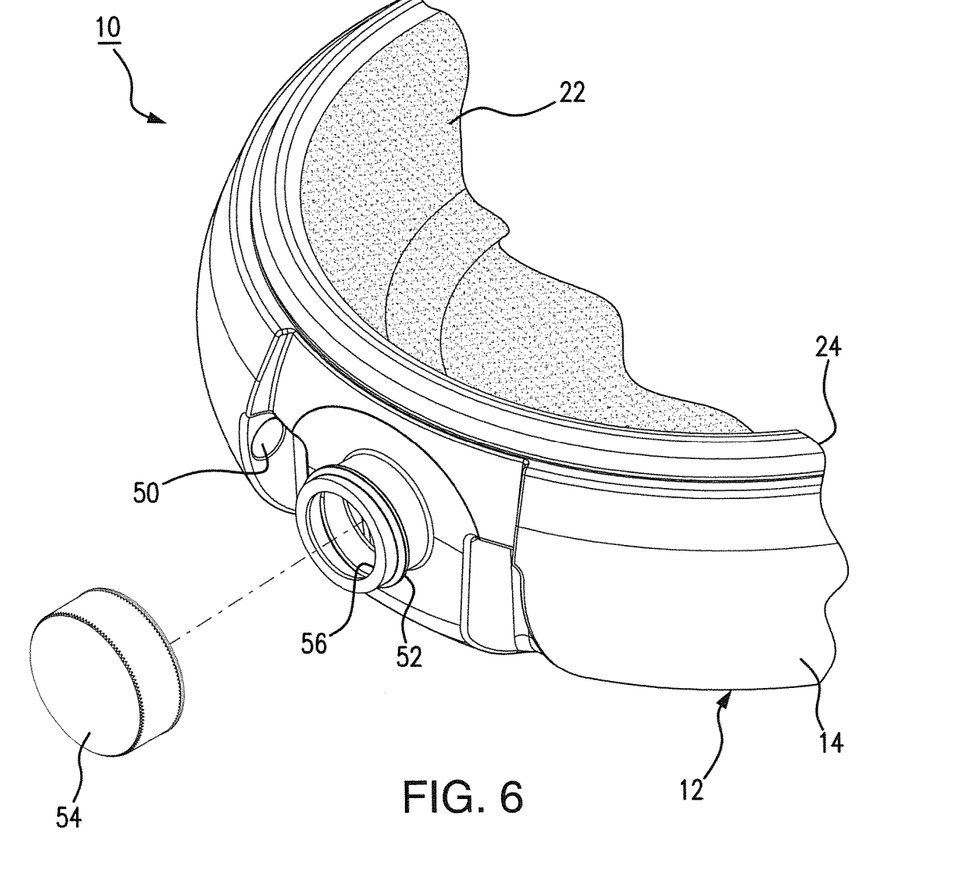
FIG. 6 is a view showing a cap member which is threadedly engageable with a drain member that is formed through the bowl member's sidewall.

In certain exemplary uses, a cap member 54 is threadedly engaged with the drain member 52. In FIG. 6, when the cap member 54 has not yet been threadedly engaged with the drain member 52, any liquid inside the liquid containing chamber 20 can be drained or if it is empty liquid can be filled into the liquid containing chamber 20. After such liquid has been either emptied or filled, the cap member 54 threadedly engages the drain member 52. FIG. 2 shows the cap 54 to be threadedly engaging the drain member 52. At such point, liquid from the liquid containing chamber 20 cannot escape to the external environment.

Referring to FIG. 5, pet feeding system 10 may further include a plurality of lower base plate recesses 62. Lower base plate recesses 62 are formed to provide an insert area for rubber or other inserts 60 which have a high coefficient of friction and which are fixedly secured within the lower base plate recesses 62. Rubber or other high coefficient of friction inserts 60 are provided in order to permit additional stability of pet feeding system 10 when placed on a base surface.

Referring now to FIG. 6, it is to be understood that cap member 54 may be in the form of a plug member for frictional engagement and contact within inlet/outlet port 56. In this manner, the plug member may be simply inserted into inlet/outlet port 56 for contiguous contact with an inner wall of port 56 to provide a reversible mechanism to close inlet port 56 subsequent to insertion of liquid into liquid containing chamber 20.

Figure 8:
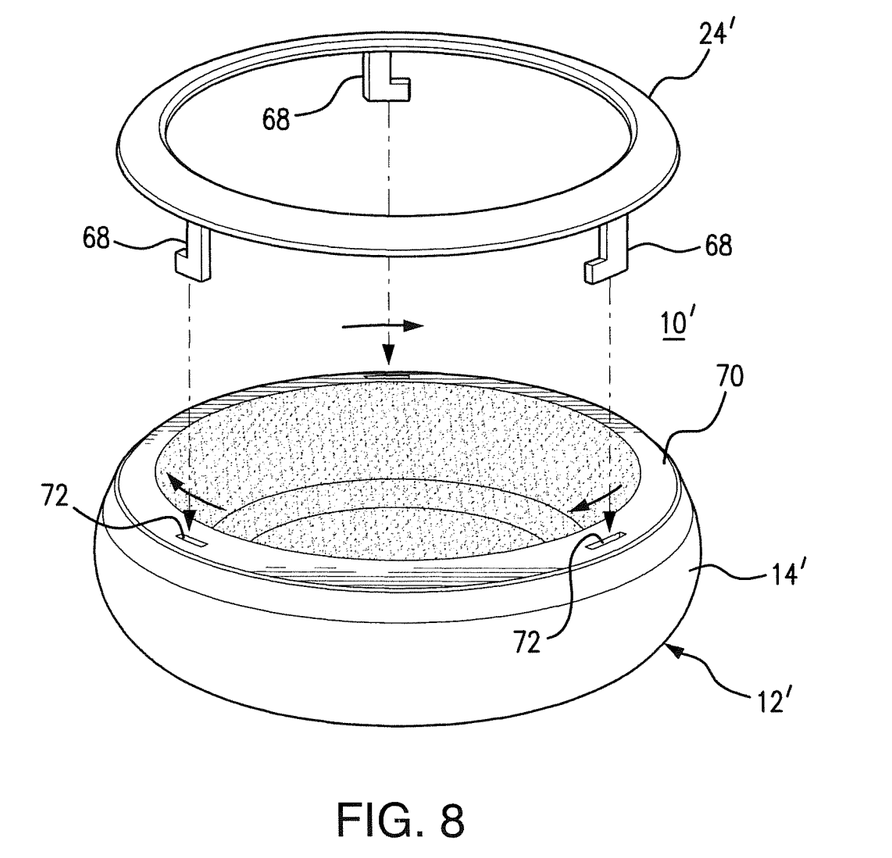

Referring now to FIG. 8, there is shown a further embodiment for mounting of lid member 24' to bowl member 12'. In this embodiment, lid member 24' includes flanges 68 which are generally L-shaped in contour and insertable in an upper surface 70 of bowl member 12'. Upper surface 70 includes a plurality of slots 72 formed in upper surface 70 of bowl 12'. Flanges 68 are insertable within slots 72 and rotated until the L-shaped flanges are rotated to an end of slots 72. In this manner, the lower portion of the flanges 68 catch the undersurface of the bowl member upper surface 70 to effect a locking of lid member 24' to bowl member 12'. Subsequent to a feeding session, the user may simply rotate lid member 24' for alignment with the open slots 72 and remove lid member 24' from bowl member 12'.

Although this invention has been described in connection with specific forms and uses thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A pet feeding system comprising:
   a bowl member, the bowl member including:
      a sidewall;
      a lower base plate and an upper base plate affixed to said sidewall integrally in one-piece formation to define a sealed liquid containing chamber therebetween, said sidewall extending vertically above said upper base plate; and
      a drain member formed through said sidewall in fluid communication with said sealed liquid containing chamber, said drain member defining a liquid inlet and outlet port for said sealed liquid containing chamber;
   at least one plate member mounted on said upper base plate and adapted to receive an ingestible food product; and
   an annularly contoured lid member rotationally and fixedly attached to said sidewall of said bowl member, said annularly contoured lid member including a hinge mechanism for rotationally attaching said annularly contoured lid member to said bowl member, said hinge mechanism including a pair of hinge arms secured to said annularly contoured lid member and being rotationally displaceable with respect to said sidewall of said bowl member, wherein said drain member is positioned between said pair of hinge arms.

2. The pet feeding system of claim 1 wherein said upper base plate has a recessed surface to receive said plate member.

3. The pet feeding system of claim 1 wherein said plate member is a disposable plate member selected from the group consisting of paper plate members and plastic plate members.

4. The pet feeding system of claim 1 wherein said annularly contoured lid member further comprises a catch mechanism for releasably engaging a sidewall protrusion member formed on said sidewall responsive to said lid being rotationally activated to a closed position.

5. The pet feeding system as recited in claim 4, wherein said catch mechanism includes a resilient catch member fixedly secured to said lid member, whereby said resilient catch member is releasably insertable over said sidewall protrusion member to releasably secure said catch member to said sidewall.

6. The pet feeding system as recited in claim 5 wherein said resilient catch member is formed in a one piece formation with said lid member.

7. The pet feeding system as recited in claim 6 wherein said sidewall protrusion member includes a substantially arcuate bar member adapted to releasably capture said resilient catch member.

8. The pet feeding system as recited in claim 5 wherein said sidewall protrusion member is positioned within a recess formed in said sidewall.

9. The pet feeding system as recited in claim 8 wherein said catch mechanism includes:
   a catch member first section integrally formed with said lid member; and
   a catch member snap section formed in a one piece formation with said catch member first section and adapted to be releasably attached to said sidewall protrusion member.

10. The pet feeding system as recited in claim 8 wherein said sidewall protrusion member includes a substantially arcuate bar member positioned within said sidewall recess.

11. The pet feeding system as recited in claim 10 wherein said catch member is contoured to engage said sidewall recess whereby a catch member snap section of said catch member is releasably captured by said arcuate bar member.

12. The pet feeding system of claim 1 wherein said pair of hinge arms is formed in an inverted U-shape formation; and
   a pair of hinge arm flange members secured respectively to each of said hinge arms and extending in a direction substantially normal to said respective hinge arms.

13. The pet feeding system as recited in claim 12 wherein each of said hinge arm flange members includes a hinge arm lug member.

14. The pet feeding system as recited in claim 13 wherein each of said hinge arm lug members is contoured having a spherical envelope.

15. The pet feeding system as recited in claim 12 wherein said pair of hinge arms are slidingly received within a hinge arm recess formed in said sidewall.

16. The pet feeding system as recited in claim 14 further comprising a pair of spaced apart hinge recesses formed in said sidewall for rotationally receiving said hinge arm lug members.

17. The pet feeding system as recited in claim 1 including a cap member threadedly engageable with said drain member.

18. The pet feeding system as recited in claim 1 including a plug member reversibly insertable within said inlet and outlet port.

19. The pet feeding system as recited in claim 1:
wherein said hinge mechanism is contoured as a yoke, and said pair of hinge arms extend around said drain member.

* * * * *